(12) United States Patent
Singh et al.

(10) Patent No.: US 7,908,584 B2
(45) Date of Patent: Mar. 15, 2011

(54) METHOD AND APPARATUS FOR CREATING AN OFFLINE SERVICE-ORIENTED ARCHITECTURE BASED APPLICATION FROM AN ONLINE SERVICE-ORIENTED ARCHITECTURE BASED APPLICATION

(75) Inventors: Uma Kant Singh, Bangalore (IN); Bachiraju Gangadhar Ramesh, Bangalore (IN)

(73) Assignee: SAP AG, Walldorf (DE)

( * ) Notice: Subject to any disclaimer, the term of this patent is extended or adjusted under 35 U.S.C. 154(b) by 945 days.

(21) Appl. No.: 11/556,573

(22) Filed: Nov. 3, 2006

(65) Prior Publication Data

US 2008/0109468 A1    May 8, 2008

(51) Int. Cl.
*G06F 9/44* (2006.01)
(52) U.S. Cl. .................. 717/106; 717/107; 717/109
(58) Field of Classification Search .................. 717/109, 717/107
See application file for complete search history.

(56) References Cited

U.S. PATENT DOCUMENTS

| | | | | |
|---|---|---|---|---|
| 7,275,105 | B2* | 9/2007 | Bloch et al. | 709/227 |
| 7,380,236 | B2* | 5/2008 | Hawley | 717/109 |
| 7,532,571 | B1* | 5/2009 | Price et al. | 370/225 |
| 2004/0139235 | A1* | 7/2004 | Rashid et al. | 709/248 |
| 2005/0188051 | A1* | 8/2005 | Sneh | 709/213 |
| 2006/0206583 | A1* | 9/2006 | Hill | 709/218 |
| 2007/0079238 | A1* | 4/2007 | Weinkauff | 715/700 |

OTHER PUBLICATIONS

Christian Stettler, "Online and Offline Operation of J2EE Enterprise Applications", Nov. 5, 2003.*

* cited by examiner

*Primary Examiner* — Wei Y Zhen
*Assistant Examiner* — Phillip H Nguyen

(57) ABSTRACT

Disclosed is a method and apparatus for automatically creating an offline enterprise application from an online enterprise application by importing the data from the online enterprise application to an offline system, including importing user interface (UI) metadata, enterprise services repository (ESR) data and application data from the online enterprise application and generating the UI and enterprise services from the imported UI metadata and ESR data respectively. The created offline enterprise application switches automatically between offline mode and online mode.

16 Claims, 6 Drawing Sheets

METHOD AND APPARATUS FOR CREATING AN OFFLINE SERVICE-ORIENTED ARCHITECTURE BASED APPLICATION FROM AN ONLINE SERVICE-ORIENTED ARCHITECTURE BASED APPLICATION

FIELD OF THE INVENTION

The invention relates to the field of enterprise software, in particular to a Service-Oriented Architecture (SOA).

BACKGROUND OF THE INVENTION

The characteristics and behavior of an online enterprise application and an offline enterprise application are different. Hence, the online enterprise application cannot be used as the offline enterprise application or vice versa as their characteristics and behaviors are different. This brings the need to develop the online enterprise application and the offline enterprise application separately. The drawback of developing the offline enterprise application and the online enterprise application separately is the cost of development and maintenance increases by almost twice or more since two enterprise applications, that is, the online enterprise application and the offline enterprise application have to be developed to provide the same business functionality. Also, the effort to develop separate applications is duplicated as the same enterprise application is developed for two connection modes, that is, online mode and offline mode.

SUMMARY OF THE INVENTION

What is described is a method and system for automatically creating an offline enterprise application from an online enterprise application by importing the data from the online enterprise application to an offline system.

An embodiment involves importing user interface (UI) metadata, enterprise services repository (ESR) data and application data from the online enterprise application and generating the UI and enterprise services from the imported UI metadata and ESR data respectively. The created offline enterprise application switches automatically between offline mode and online mode.

DETAILED DESCRIPTION

Figure 1:
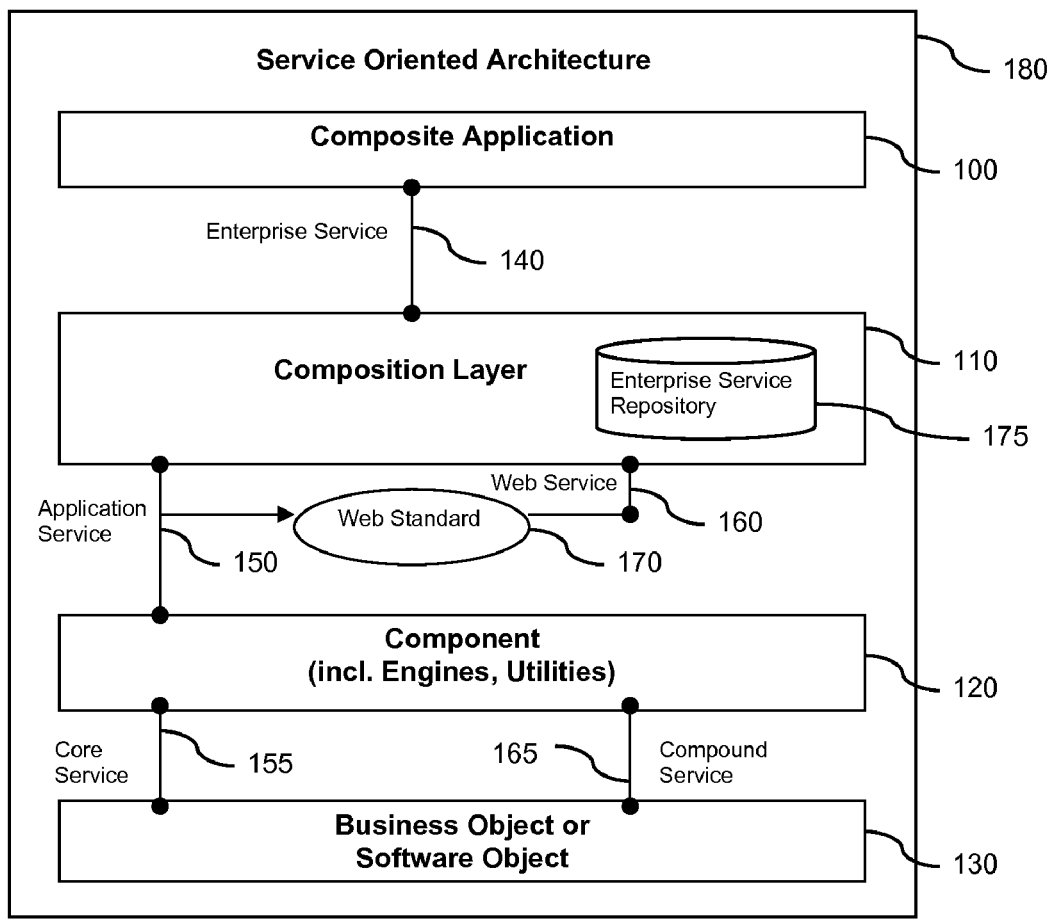
FIG. 1 is a block diagram of a service oriented architecture (SOA) according to an embodiment of the invention.

An enterprise application is developed using enterprise service architecture (ESA). An offline enterprise application may be created from an online enterprise application. The creation of the offline enterprise application from the online enterprise application typically involves importing data from the online enterprise application and generating the offline enterprise application based on the imported data.

The enterprise application provides a set of enterprise services such as sales, material management, financial services, logistics services, human resource services. The enterprise services are contained in an enterprise server in the enterprise application. A user interface (UI) that displays the data to a user connects to the enterprise server. The enterprise application can be an offline enterprise application or an online enterprise application. The offline enterprise application has the enterprise server on the same system as where the UI is installed whereas the online enterprise application may have the enterprise server on a system different from that of the system where the UI is installed. Such an enterprise server is known as online enterprise server. The UI connects to the online enterprise server over a communication network. The online enterprise application works in an online mode, that is, the UI is always connected to the online enterprise server. The offline enterprise application works in an offline mode, which means the UI connects to the enterprise server on the same system as the UI. The application logic or the business functionality of both the applications still remains the same. Typically, the online enterprise server caters to more than one user, that is, more than one user can connect to the online enterprise server. The online enterprise server contains the data of all the users connecting to the online enterprise server. The offline enterprise application caters to a limited number of users, typically lesser than the number of users than the online enterprise application caters to.

Consider a sales scenario of a large company that sells consumer products like soaps, toothpaste, beverages, etc., to retailers or resellers. The salespersons of the company take the sales orders from the retailers. The salesperson goes to the retailers' shops in the designated sales area and takes the sales order in, for example, a portable computer like a laptop or pocket pc. In this scenario, where the salespersons are in the field taking sales orders, there is no network connectivity to online enterprise server of the company. Thus, the online enterprise application is not suitable. The offline enterprise application is more suitable here as the offline enterprise application does not require network connectivity. The orders can be updated in the enterprise server of the offline enterprise application as the enterprise server is in the same system as the UI. Later in the day, the salespersons return to their regional office and connect their portable systems to the online enterprise server of the company over a communication network and update the sales orders in the online enterprise server of the company. The online enterprise server has sales orders from all the salespersons of the company whereas the offline enterprise server on the systems of the salespersons has only the sales orders that correspond to them. Thus, the characteristics and behavior of the online enterprise application and the offline enterprise applications are different.

The enterprise application is developed using the ESA which is a blue print of service oriented architecture (SOA). SOA supports the design, development, identification and consumption of standardized software services across an enterprise, thereby improving reusability and flexibility of software components. ESA is a blueprint for SOA that more effectively addresses business software needs and is rapidly deployable.

FIG. 1 is a block diagram of the SOA 180. Composite application 100 uses data and functions provided as services that include application service 150 and web service 160 by the underlying component 120. The composite application 100 may add business logic and provide user interfaces to support a business application.

A composition layer 110 allows a model based composition and orchestration of services to enhance business processes. The composition layer 110 allows the development, deployment and administration of enterprise service 140. The composition layer 110 typically provides tools for creating and managing enterprise service 140 and also typically supports the design, implementation and execution of applications that use enterprise service 140 such as composite application 100. The composition layer 110 typically includes an enterprise service repository (ESR) 175 which is a central repository where enterprise service 140 and business object or software object 130 are modeled and their corresponding metadata stored. The enterprise service 140 is typically a web service 160 that has an enterprise level business meaning. The enterprise service 140 is typically an aggregation of application service 150 or web service 160 of lower or smaller business functionality combined with business logic to support a step of a business process. The enterprise service 140 is typically hosted in an enterprise server. The web service 160 represents a self-contained, self-describing piece of application functionality that can be accessed by other applications. An application service 150 represents services exposed from an application component or component 120 and allows access to a lower or smaller level of functionality of enterprise applications. An application service 150 can either be implemented in proprietary standard or could be implemented in web standard 170 such as extensible markup language (XML) to become a web service 160.

Component 120 is typically a modular, re-usable piece of application software and consists of various entities such as engines, utilities and business object or software object 130. SOA applications are constructed from the component 120 and composite application 100 in the ESA. The business object or software object 130 typically provides a set of functionalities or services such as a core service 155 and a compound service 165. For example, a customer or business partner software object may provide the core service 155 such as obtaining the name, address, and contact details of a customer. The compound service 165 may operate on multiple software objects 130. An example of compound service 165 is obtaining a list of customers for a product which may involve obtaining data from the customer software object and a product software object.

Figure 2:
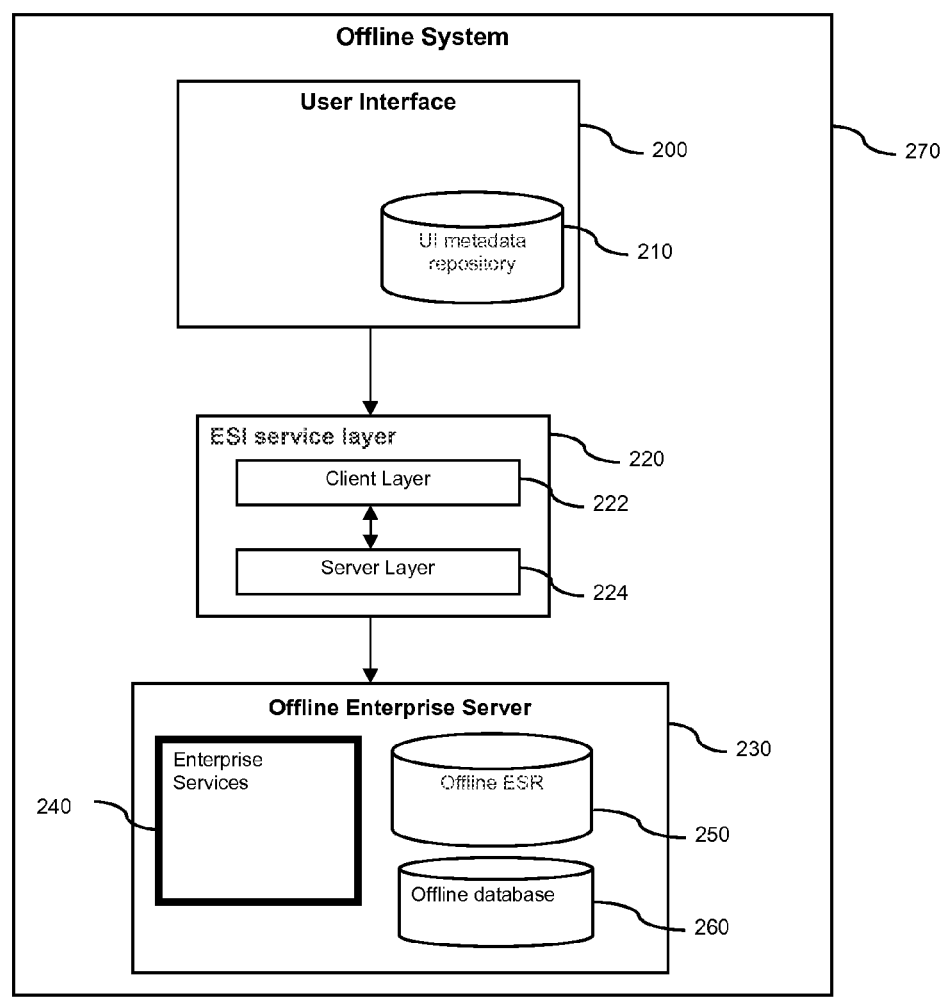
FIG. 2 is a block diagram of an offline system running an offline enterprise application according to an embodiment of the invention.

FIG. 2 is a block diagram of an offline system 270 running an offline enterprise application according to an embodiment of the invention. The offline enterprise application includes a user interface (UI) 200 that connects to an offline enterprise server 230 via the enterprise service infrastructure (ESI) service layer 220 in the offline system 270. The offline enterprise server 230 includes an enterprise service 240, an offline enterprise services repository (ESR) 250 that contains metadata of the enterprise services 240 and an offline database 260 that contains application data of the offline enterprise application. The enterprise services 240 provided by the offline enterprise application include services like sales, material management, financial services, logistics services, and human resource services. It will be clear to one skilled in the art that the offline enterprise server 230 may be implemented in languages that include Java, C, and C++. The UI 200 includes pattern based user interfaces which are developed using frameworks that include Web Dynpro patterns, and Visual Composer, both provided by SAP AG, JFace a freeware program that is part of the Eclipse platform provided by Eclipse Foundation Inc. which is an open source community. It will be clear to one skilled in the art that the UI 200 may be developed in languages such as Java, C, and C++.

The offline enterprise application includes a UI metadata repository 210 that contains metadata of the UI 200 of the application. The UI 200 is generated from the metadata stored in the UI metadata repository 210. The ESI service layer 220 establishes the connection between the UI 200 and the offline enterprise server 230. The ESI service layer 220 includes two logical layers, namely, a client layer 222 and a server layer 224. The client layer 222 of the ESI service layer has a standard application programming interface (API) to access the enterprise services 240 provided by the offline enterprise server 230. The server layer 224 of the ESI service layer 220 hosts the enterprise services 240 provided by the offline enterprise server 230 and exposes a set of interfaces for the hosted enterprise services 240. The client layer 222 accesses the hosted enterprise services 240 by accessing the interfaces exposed by the server layer 224. Thus, the ESI service layer 220 acts as an interface between the UI 200 and the offline enterprise application server 230.

Figure 3:
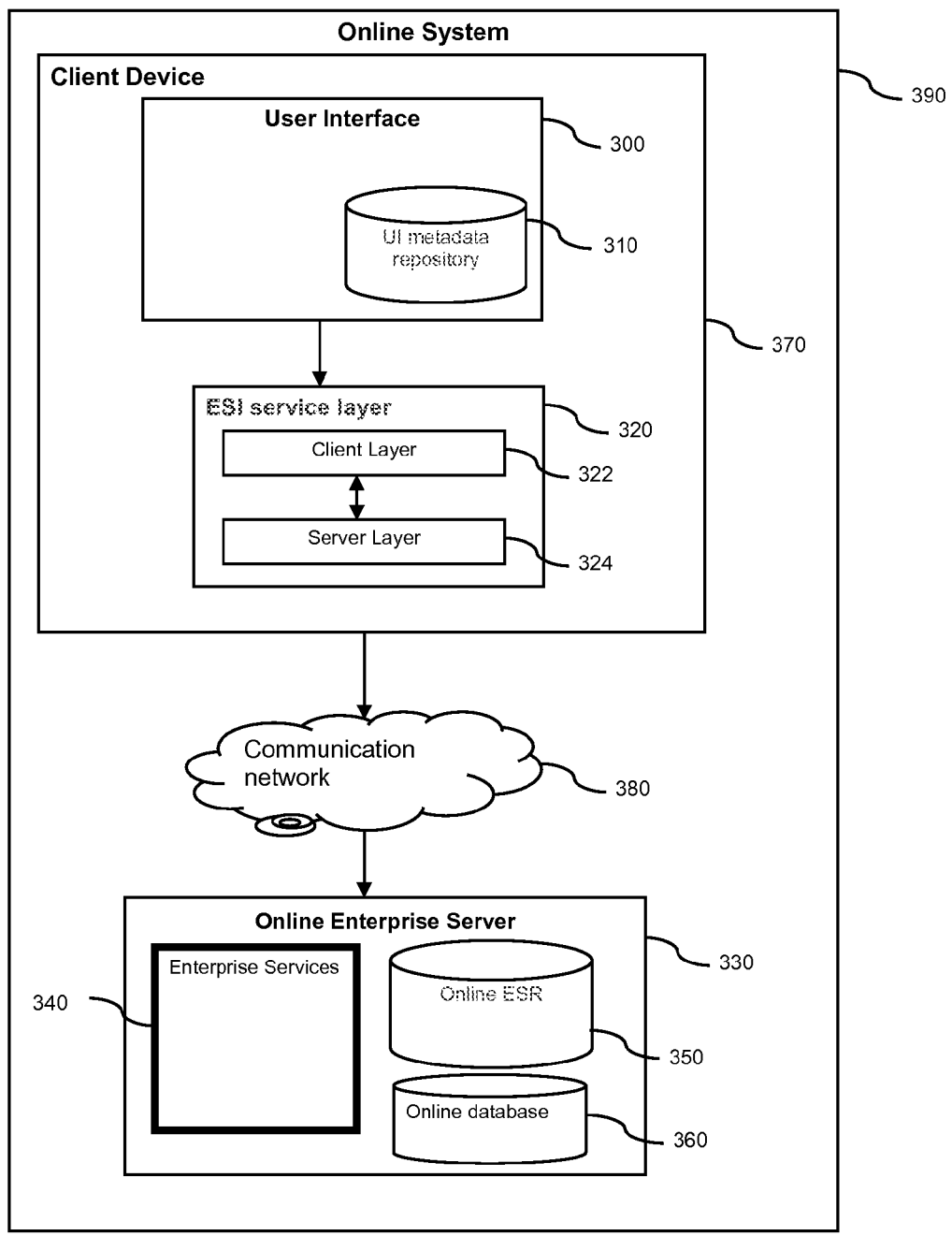
FIG. 3 is a block diagram of an online system running an online enterprise application according to an embodiment of the invention.

FIG. 3 is a block diagram of an online system 390 running an online enterprise application according to an embodiment of the invention. The online system 390 includes a client device 370 on which the user interface (UI) 300 of the online enterprise application is installed and an online enterprise server 330 that provides enterprise services 340 of the online enterprise application. The client device 370 connects to the online enterprise server 330 over a communication network 380. The online enterprise server 330 includes the enterprise services 340, an online enterprise service repository (ESR) 350 that contains metadata of the enterprise services 340 and an online database 360 that contains application data of the online enterprise application. The enterprise services 340 provided by the online enterprise application are generated using the enterprise services metadata stored in the online ESR 350. The enterprise services 340 provided by the online enterprise application include services like sales, material management, financial services, logistics services, and human resource services.

The client device 370 includes a UI metadata repository 310 that contains metadata of the UI 300. The UI 300 is generated from the UI metadata stored in the UI metadata repository 310. The UI 300 includes pattern based user interfaces which may be developed using frameworks that include Web Dynpro patterns and Visual Composer both provided by SAP AG. JFace a freeware program that is part of the Eclipse platform provided by Eclipse Foundation Inc. which is an open source community. It will be clear to one skilled in the art that the UI 300 may be developed in languages which include Java, C, and C++. The ESI service layer 320 of the client device allows the client device 370 to connect to the online enterprise server 330.

The ESI service layer 320 includes two logical layers, namely, a client layer 322 and a server layer 324. The client layer 322 of the ESI service layer has a standard application programming interface (API) to access the enterprise services 340 provided by the online enterprise server 330. The server layer 324 of the ESI service layer 320 hosts the enterprise services 340 provided by the online enterprise server 330 and exposes a set of interfaces for the hosted enterprise services 340. The client layer 322 accesses the hosted enterprise services 340 by accessing the interfaces exposed by the server layer 324. Thus, the ESI service layer 320 acts as an interface between the client device 370 and the online enterprise server 330. The online enterprise server 330 supports more than one client, i.e., more than one client can connect to the online enterprise server 330. The online database 360 typically stores large amount of application data. The online database 360 may store application data of more than one client.

Figure 4:
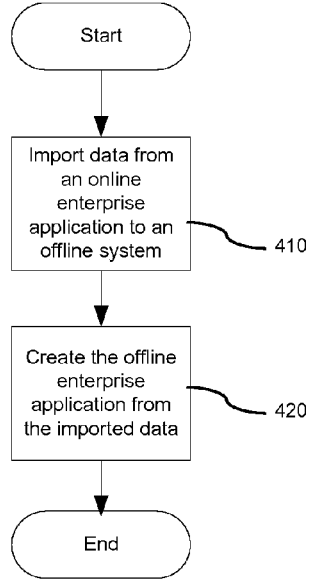
FIG. 4 is a flow diagram to create the offline enterprise application from the online enterprise application according to an embodiment of the invention.

The development cost and the effort involved in creating the offline enterprise application can be minimized by typically creating the offline enterprise application automatically from an already developed online enterprise application. FIG. 4 is a flow diagram to create the offline enterprise application from the online enterprise application according to an embodiment of the invention. The process of creating the offline enterprise application from the online enterprise application involves importing data from the online enterprise application to an offline system as depicted in step 410 and creating the offline enterprise application from the imported data as depicted in step 420.

Figure 5:
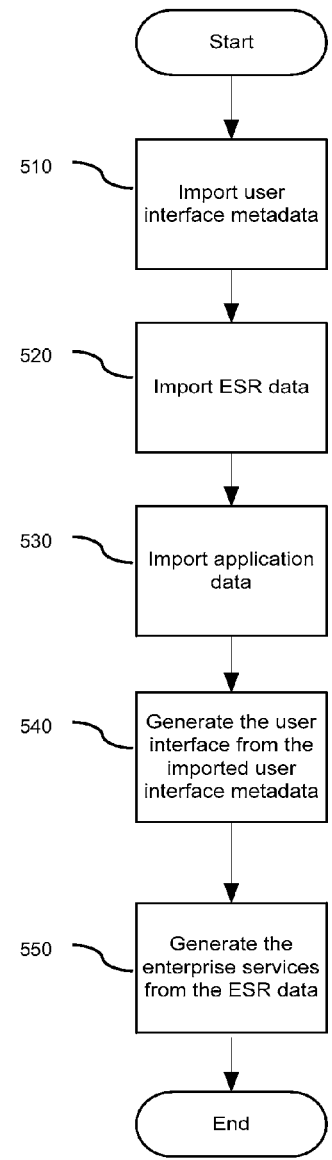
FIG. 5 is a flow diagram of FIG. 4 to create the offline enterprise application from the online enterprise application according to an embodiment of the invention.

FIG. 5 is a flow diagram of FIG. 4 to create the offline enterprise application from the online enterprise application according to an embodiment of the invention. Importing data from the online enterprise application to the offline system includes importing UI metadata as depicted at step 510, importing ESR data as depicted at step 520 and importing application data as depicted at step 530. After importing the data, the offline enterprise application is created by generating the UI from the imported UI metadata as depicted by step 540 and generating the enterprise services from the imported ESR data as depicted by step 550.

Figure 6:
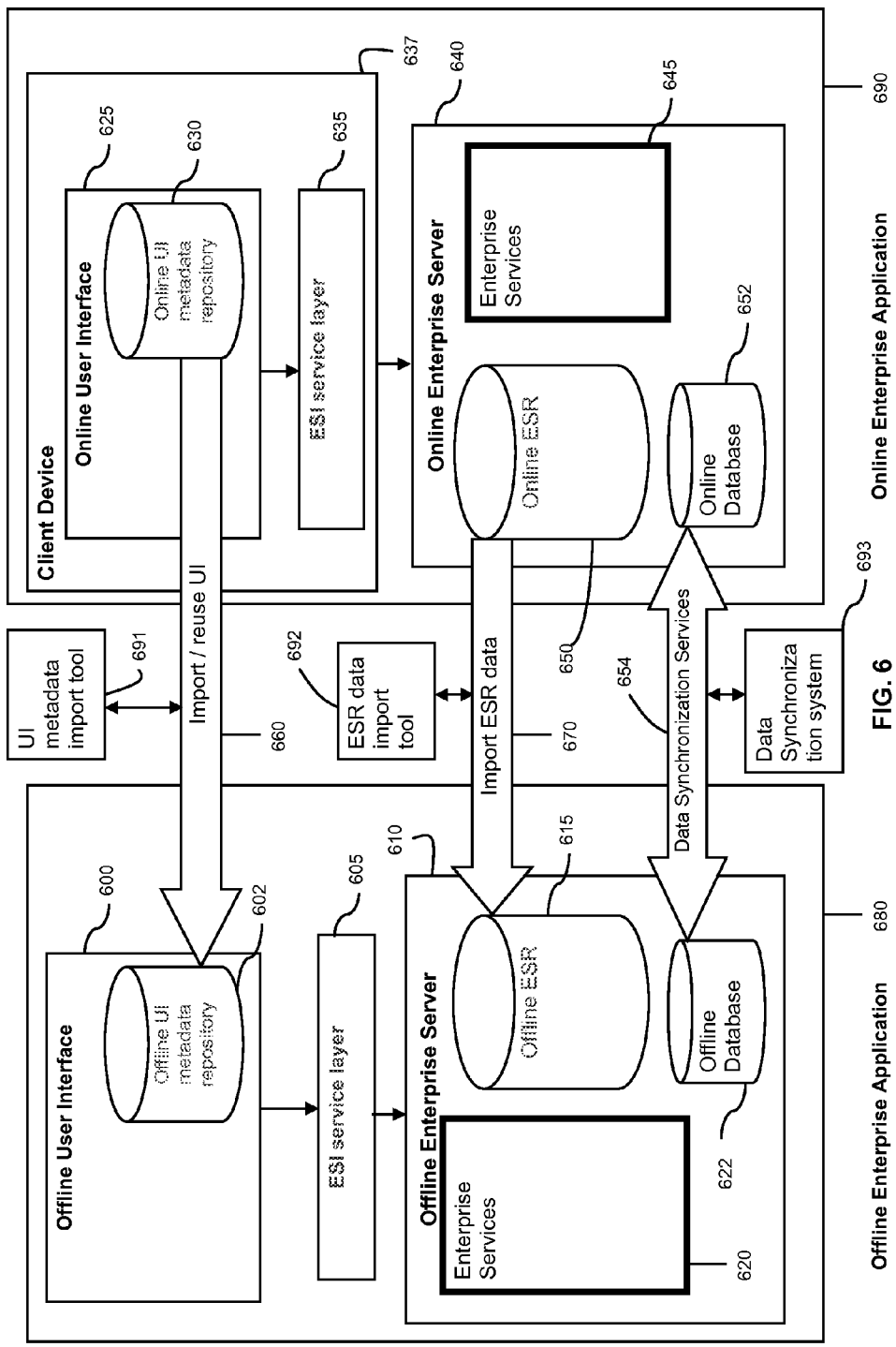
FIG. 6 is a block diagram of a system to create the offline enterprise application from the online enterprise application according to an embodiment of the invention.

FIG. 6 is a block diagram of a system to create the offline enterprise application 680 from the online enterprise application 690 according to an embodiment of the invention. The process of creating the offline enterprise application 680 from the online enterprise application 690 involves importing data from the online enterprise application 690 to the offline enterprise application 680 that runs in an offline system and building the offline enterprise application 680 from the imported data. The data to be imported from the online enterprise application 690 include UI metadata, ESR data and application data. The online UI metadata in the online UI metadata repository 630 is imported to offline UI metadata repository 602 in the offline enterprise application 680 as depicted by 660. The UI metadata is imported to the offline enterprise application 680 using a UI metadata import tool 691. The ESR data in the online ESR 650 is imported to the offline ESR 615 in the offline enterprise application 680 as depicted by 670. The ESR data is imported to the offline enterprise application 680 using an ESR data import tool 692. The application data in an online database 652 is imported to an offline database 622 as depicted by 654. The offline database 622 is created in the offline enterprise application 680 based on the imported ESR data. The application data is imported from the online database 652 to the offline database 622 in the offline enterprise application 680 using a data synchronization system 693. The data synchronization system 693 includes a set of subscription rules that determine which application data are transferred, that is, the application data relevant only to a particular user is transferred; for example, in a sales scenario, only the sales order relevant to a particular salesperson is transferred to the offline database 622 from the online database 652.

After importing the above data, the offline enterprise application 680 is generated from the imported data. Creating the offline enterprise application 680 from the imported data involves generating the offline UI 600 and generating the enterprise services 620. The offline UI 600 is generated from the imported UI metadata in the offline UI metadata repository 602. The online UI 625 on the client device 637 may be reused if the offline enterprise server 610 is installed on the same client device 637. The enterprise services 620 are generated from the imported ESR data in the offline ESR 615. The offline UI 600 may access the enterprise services 620 in the offline enterprise server 610 by connecting to the offline enterprise server 610 via the ESI service layer 605 in a way similar to the online UI 625 accessing the enterprise services 645 in the online enterprise server 640 via the ESI service layer 635. The generated enterprise services 620 may be customized by adding any specific application logic, if needed, for an offline behavior. In an embodiment, the whole process of creating the offline enterprise application 680 from the online enterprise application 690 is done automatically, for example, by the click of a button.

Figure 7:
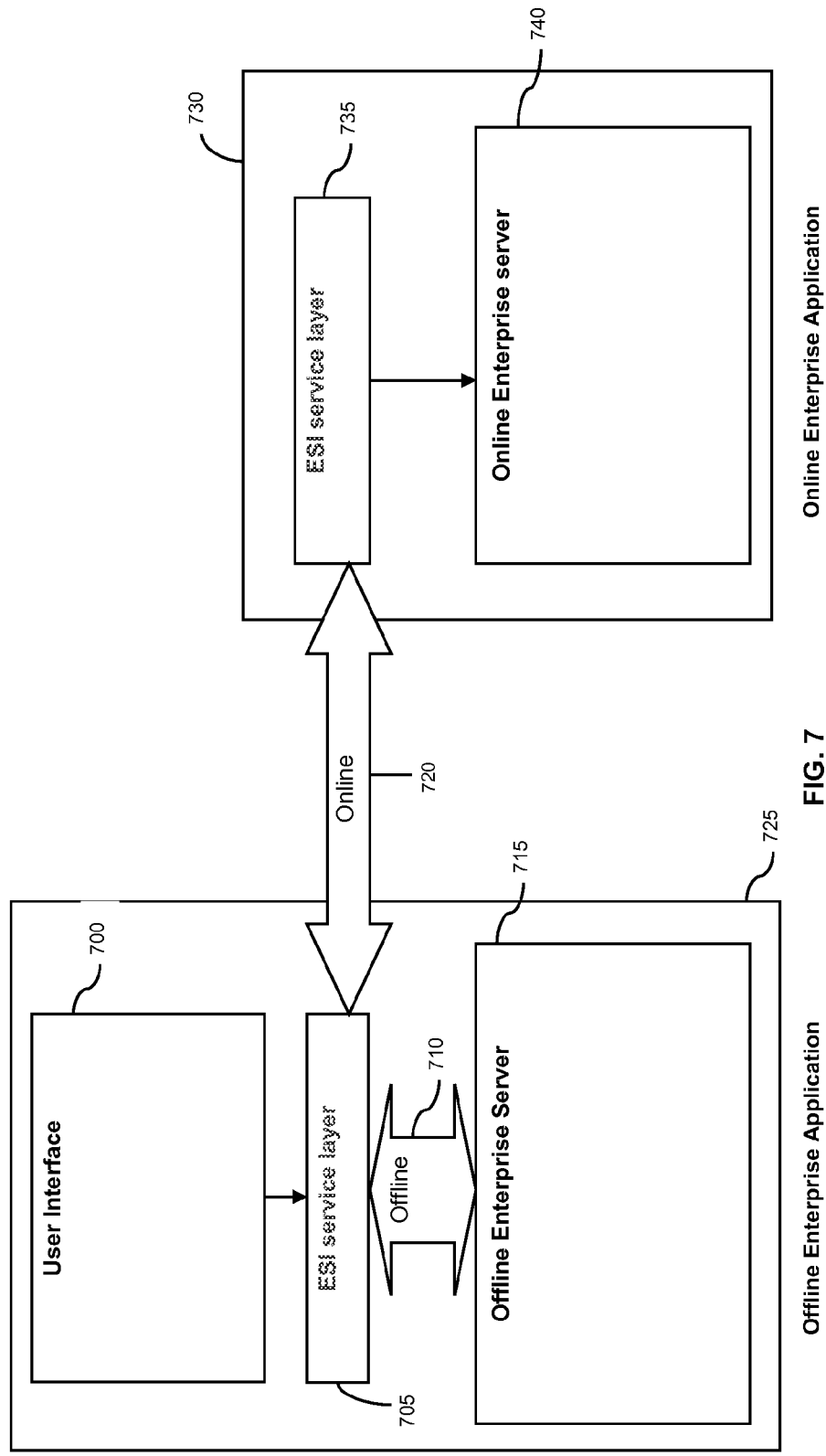
FIG. 7 is a block diagram of a system to switch the offline enterprise application between online mode and offline mode according to an embodiment of the invention.

FIG. 7 is a block diagram of a system to switch the offline enterprise application 725 between online mode and offline mode according to an embodiment of the invention. The offline enterprise application 725 also works as an online enterprise application 730. The UI 700 of the offline enterprise application 725 connects to the offline enterprise server 715 in the offline mode 710 and to the online enterprise server 740 in the online mode 720. The switch may be configured to be automatic and is triggered by an event, for example, network connectivity. The offline enterprise application 725 switches to offline mode 710 automatically by connecting to the offline enterprise server 715 when the network connection, that is, the connection to the online enterprise server 740, is lost and switches back to the online mode 720 by connecting to the online enterprise server 740 via ESI service layer 735 when the network connection is regained. The ESI service layer 705 of the offline application switches between the offline enterprise server 715 and the online enterprise server 740 based on the connection mode. In the offline mode 710, the ESI service layer 705 connects the UI 700 to the offline enterprise server 715 and in the online mode 720; the ESI service layer 705 connects the UI 700 to the online enterprise server 740.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, other type of machine-readable media suitable for storing electronic instructions. The present invention may be downloaded as a computer program which may be transferred from a remote computer (e.g., a server) to a requesting computer (e.g., a client) by way of a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is:

1. A computerized method for creating an offline enterprise application from an online enterprise application, the method comprising:
   importing data from the online enterprise application to an offline system based on data subscription rules, wherein the data comprises user interface (UI) metadata, enterprise service repository (ESR) data, and application data;
   creating the offline enterprise application for the offline system automatically from the imported data by generating an offline UI from the imported UI metadata, and generating enterprise services from the imported ESR data, wherein the offline UI access the enterprise services by connecting to an offline enterprise server via an enterprise service infrastructure (ESI) service layer; and
   customizing the generated enterprise services by adding a specific business logic to the generated enterprise services.

2. The computerized method of claim 1, wherein importing data comprises:
   importing the UI metadata from an online UI metadata repository to an offline UI metadata repository;
   importing the ESR data from an online ESR to an offline ESR; and
   importing the application data from an online database to an offline database.

3. The computerized method of claim 2, wherein importing the application data from the online database to the offline database comprises creating the offline database based on the imported ESR data.

4. The computerized method of claim 1, wherein the data subscription rules determine which application data are transferred from the online enterprise application to the offline system.

5. The computerized method of claim 1, wherein the offline enterprise application further comprises automatically switching between an offline mode and an online mode based on the availability of the connection to an online enterprise server.

6. The computerized method of claim 1, wherein creating the offline enterprise application is triggered by an event.

7. A system for creating an offline enterprise application from an online enterprise application, the system comprising:
   a user interface (UI) metadata import tool to import UI metadata from the online enterprise application of an online system to an offline system based on data subscription rules;
   an enterprise service repository (ESR) import tool to import ESR data from the online enterprise application of the online system to the offline system based on the data subscription rules; and
   a data synchronization system to transfer application data from the online enterprise application of the online system to the offline system based on the data subscription rules, wherein the offline enterprise application is created automatically by:
      generating an offline UI from the imported UI metadata;
      generating enterprise services from the imported ESR data, wherein the offline UI accesses the enterprise services by connecting to an offline enterprise server via a enterprise service infrastructure (ESI) service layer; and
      customizing the generated enterprise services by adding a specific business logic to the generated enterprise services.

8. The system of claim 7, wherein the offline system further comprises:
   a processor in communication with a memory;
   an offline user interface (UI) metadata repository stored in the memory;
   the offline enterprise server that provides the enterprise services;
   an offline enterprise service repository (ESR) in the offline enterprise server that contains metadata of the enterprise services;
   the ESI service layer that connects the offline enterprise server to the UI; and
   an offline database that comprises the application data of the offline enterprise application.

9. The system of claim 7, wherein the online system further comprises:
   a processor in communication with a memory;
   an online user interface (UI) metadata repository stored in the memory;
   an online enterprise server that provides enterprise services;
   an online enterprise service repository (ESR) in the enterprise server that contains metadata of the enterprise services;
   an enterprise service infrastructure (ESI) service layer that connects the UI to the online enterprise server over a communication network; and
   an online database that comprises application data of the online enterprise application.

10. The system of claim 8, wherein the ESI service layer of the offline system further comprises an automatic switch between the enterprise server of the online system and the offline system based on the connection mode.

11. The system of claim 7, wherein the online system, offline system and data synchronization system communicate over a communication network.

12. An article of manufacture, comprising:
   a machine readable storage medium having instructions that when executed by a machine cause the machine to execute a method, comprising:
   importing data from an online enterprise application to an offline system based on data subscription rules, wherein the data comprises user interface (UI) metadata, enterprise service repository (ESR) data and application data;
   creating an offline enterprise application for the offline system automatically from the imported data by generating an offline UI from the imported UI metadata, and generating enterprise services from the imported ESR data, wherein the offline UI access the enterprise services by connecting to an offline enterprise server via an enterprise service infrastructure (ESI) service layer; and
   customizing the generated enterprise services by adding a specific business logic to the generated enterprise services.

13. The article of manufacture of claim 10, wherein the data subscription rules determine which application data are transferred from the online enterprise application to the offline system.

14. The article of manufacture of claim 13, wherein importing the application data from the online database to the offline database comprises creating the offline database based on the imported ESR data.

15. The article of manufacture of claim 14, wherein the data subscription rules determine which application data are transferred from the online enterprise application to the offline system.

16. The article of manufacture of claim 12, wherein the offline enterprise application further comprises instructions for automatically switching between an offline mode and an online mode based on the availability of the connection to an online enterprise server.

* * * * *